(12) United States Patent
Chui et al.

(10) Patent No.: US 7,142,346 B2
(45) Date of Patent: Nov. 28, 2006

(54) SYSTEM AND METHOD FOR ADDRESSING A MEMS DISPLAY

(75) Inventors: Clarence Chui, San Mateo, CA (US); Mithran C. Mathew, Mountain View, CA (US); Marc Mignard, Berkeley, CA (US)

(73) Assignee: IDC, LLC, San Francisco, CA (US)

( * ) Notice: Subject to any disclaimer, the term of this patent is extended or adjusted under 35 U.S.C. 154(b) by 0 days.

(21) Appl. No.: 11/051,251

(22) Filed: Feb. 4, 2005

(65) Prior Publication Data

US 2005/0206991 A1 Sep. 22, 2005

Related U.S. Application Data

(63) Continuation-in-part of application No. 10/731,989, filed on Dec. 9, 2003.

(60) Provisional application No. 60/613,458, filed on Sep. 27, 2004, provisional application No. 60/606,223, filed on Aug. 31, 2004, provisional application No. 60/604,896, filed on Aug. 27, 2004, provisional application No. 60/614,032, filed on Aug. 27, 2004.

(51) Int. Cl.
*G02B 26/00* (2006.01)
*G02F 1/01* (2006.01)

(52) U.S. Cl. ............... 359/290; 359/291; 359/276

(58) Field of Classification Search ........ 359/238, 359/245, 276, 277, 290–292, 298, 315, 316
See application file for complete search history.

(56) References Cited

U.S. PATENT DOCUMENTS

| | | | |
|---|---|---|---|
| 3,982,239 A | 9/1976 | Sherr | |
| 4,403,248 A | 9/1983 | te Velde | |
| 4,441,791 A | 4/1984 | Hornbeck | |
| 4,459,182 A | 7/1984 | te Velde | |
| 4,482,213 A | 11/1984 | Piliavin et al. | |
| 4,500,171 A | 2/1985 | Penz et al. | |
| 4,519,676 A | 5/1985 | te Velde | |
| 4,566,935 A | 1/1986 | Hornbeck | |
| 4,571,603 A | 2/1986 | Hornbeck et al. | |
| 4,596,992 A | 6/1986 | Hornbeck | |
| 4,615,595 A | 10/1986 | Hornbeck | |
| 4,662,746 A | 5/1987 | Hornbeck | |
| 4,681,403 A | 7/1987 | te Velde et al. | |
| 4,710,732 A | 12/1987 | Hornbeck | |
| 4,856,863 A | 8/1989 | Sampsell et al. | |
| 4,859,060 A | 8/1989 | Katagiri et al. | |
| 4,954,789 A | 9/1990 | Sampsell | |

(Continued)

FOREIGN PATENT DOCUMENTS

DE 19526656 A1 1/1997

(Continued)

OTHER PUBLICATIONS

Seeger et al., "Stabilization of Electrostatically Actuated Mechanical Devices", (1997) International Conference on Solid State Sensors and Actuators; vol. 2, pp. 1133-1136.

(Continued)

*Primary Examiner*—Loha Ben
*Assistant Examiner*—William Choi
(74) *Attorney, Agent, or Firm*—Knobbe Martens Olson & Bear LLP

(57) ABSTRACT

A system and method for addressing an array of MEMS display elements, such as interferometric modulators, from a drive control. A display includes groups of display elements that are addressed with a commonly applied drive signal. In one embodiment, the groups of display elements are configured to have different response times and are driven by pulses of varying length indicative of those response times. In another embodiment, the groups of display elements are configured to have different actuation voltages and are driven by pulses of varying voltage indicative of those actuation voltages.

10 Claims, 10 Drawing Sheets

U.S. PATENT DOCUMENTS

| | | |
|---|---|---|
| 4,956,619 A | 9/1990 | Hornbeck |
| 4,982,184 A | 1/1991 | Kirkwood |
| 5,018,256 A | 5/1991 | Hornbeck |
| 5,028,939 A | 7/1991 | Hornbeck et al. |
| 5,037,173 A | 8/1991 | Sampsell et al. |
| 5,061,049 A | 10/1991 | Hornbeck |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,142,405 A | 8/1992 | Hornbeck |
| 5,142,414 A | 8/1992 | Koehler et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,287,215 A | 2/1994 | Warde et al. |
| 5,296,950 A | 3/1994 | Lin et al. |
| 5,305,640 A | 4/1994 | Boysel et al. |
| 5,312,513 A | 5/1994 | Florence et al. |
| 5,323,002 A | 6/1994 | Sampsell et al. |
| 5,325,116 A | 6/1994 | Sampsell |
| 5,327,286 A | 7/1994 | Sampsell et al. |
| 5,331,454 A | 7/1994 | Hornbeck |
| 5,339,116 A | 8/1994 | Urbanus et al. |
| 5,365,283 A | 11/1994 | Doherty et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,461,411 A | 10/1995 | Florence et al. |
| 5,489,952 A | 2/1996 | Gove et al. |
| 5,497,172 A | 3/1996 | Doherty et al. |
| 5,497,197 A | 3/1996 | Gove et al. |
| 5,499,062 A | 3/1996 | Urbanus |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,563,398 A | 10/1996 | Sampsell |
| 5,567,334 A | 10/1996 | Baker et al. |
| 5,570,135 A | 10/1996 | Gove et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,598,565 A | 1/1997 | Reinhardt |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,612,713 A | 3/1997 | Bhuva et al. |
| 5,619,365 A | 4/1997 | Rhoads et al. |
| 5,619,366 A | 4/1997 | Rhoades et al. |
| 5,629,790 A | 5/1997 | Neukermans et al. |
| 5,633,652 A | 5/1997 | Kanbe et al. |
| 5,636,052 A | 6/1997 | Arney et al. |
| 5,638,084 A | 6/1997 | Kalt |
| 5,638,946 A | 6/1997 | Zavracky |
| 5,646,768 A | 7/1997 | Kaeiyama |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,745,193 A | 4/1998 | Urbanus et al. |
| 5,745,281 A | 4/1998 | Yi et al. |
| 5,754,160 A | 5/1998 | Shimizu et al. |
| 5,771,116 A | 6/1998 | Miller et al. |
| 5,784,212 A | 7/1998 | Hornbeck |
| 5,808,780 A | 9/1998 | McDonald |
| 5,818,095 A | 10/1998 | Sampsell |
| 5,835,255 A | 11/1998 | Miles |
| 5,842,088 A | 11/1998 | Thompson |
| 5,867,302 A | 2/1999 | Fleming et al. |
| 5,912,758 A | 6/1999 | Knipe et al. |
| 5,943,158 A | 8/1999 | Ford et al. |
| 5,959,763 A | 9/1999 | Bozler et al. |
| 5,966,235 A | 10/1999 | Walker et al. |
| 5,986,796 A | 11/1999 | Miles |
| 6,028,690 A | 2/2000 | Carter et al. |
| 6,038,056 A | 3/2000 | Florence et al. |
| 6,040,937 A | 3/2000 | Miles |
| 6,049,317 A | 4/2000 | Thompson et al. |
| 6,055,090 A | 4/2000 | Miles |
| 6,061,075 A | 5/2000 | Nelson et al. |
| 6,099,132 A | 8/2000 | Kaeriyama |
| 6,100,872 A | 8/2000 | Aratani et al. |
| 6,113,239 A | 9/2000 | Sampsell et al. |
| 6,147,790 A | 11/2000 | Meier et al. |
| 6,160,833 A | 12/2000 | Floyd et al. |
| 6,180,428 B1 | 1/2001 | Peeters et al. |
| 6,201,633 B1 | 3/2001 | Peeters et al. |
| 6,232,936 B1 | 5/2001 | Gove et al. |
| 6,275,326 B1 | 8/2001 | Bhalla et al. |
| 6,282,010 B1 | 8/2001 | Sulzbach et al. |
| 6,295,154 B1 | 9/2001 | Laor et al. |
| 6,304,297 B1 | 10/2001 | Swan |
| 6,323,982 B1 | 11/2001 | Hornbeck |
| 6,327,071 B1 | 12/2001 | Kimura |
| 6,356,085 B1 | 3/2002 | Ryat et al. |
| 6,356,254 B1 | 3/2002 | Kimura |
| 6,429,601 B1 | 8/2002 | Friend et al. |
| 6,433,917 B1 | 8/2002 | Mei et al. |
| 6,447,126 B1 | 9/2002 | Hornbeck |
| 6,465,355 B1 | 10/2002 | Horsley |
| 6,466,358 B1 | 10/2002 | Tew |
| 6,473,274 B1 | 10/2002 | Maimone et al. |

| | | |
|---|---|---|
| 6,480,177 B1 | 11/2002 | Doherty et al. |
| 6,496,122 B1 | 12/2002 | Sampsell |
| 6,501,107 B1 | 12/2002 | Sinclair et al. |
| 6,507,331 B1 | 1/2003 | Schlangen et al. |
| 6,545,335 B1 | 4/2003 | Chua et al. |
| 6,548,908 B1 | 4/2003 | Chua et al. |
| 6,549,338 B1 | 4/2003 | Wolverton et al. |
| 6,552,840 B1 | 4/2003 | Knipe |
| 6,574,033 B1 | 6/2003 | Chui et al. |
| 6,589,625 B1 | 7/2003 | Kothari et al. |
| 6,593,934 B1 | 7/2003 | Liaw et al. |
| 6,600,201 B1 | 7/2003 | Hartwell et al. |
| 6,606,175 B1 | 8/2003 | Sampsell et al. |
| 6,625,047 B1 | 9/2003 | Coleman, Jr., deceased |
| 6,630,786 B1 | 10/2003 | Cummings et al. |
| 6,632,698 B1 | 10/2003 | Ives |
| 6,643,069 B1 | 11/2003 | Dewald |
| 6,650,455 B1 | 11/2003 | Miles |
| 6,666,561 B1 | 12/2003 | Blakley |
| 6,674,090 B1 | 1/2004 | Chua et al. |
| 6,674,562 B1 | 1/2004 | Miles |
| 6,680,792 B1 | 1/2004 | Miles |
| 6,710,908 B1 | 3/2004 | Miles et al. |
| 6,741,377 B1 | 5/2004 | Miles |
| 6,741,384 B1 | 5/2004 | Martin et al. |
| 6,741,503 B1 | 5/2004 | Farris et al. |
| 6,747,785 B1 | 6/2004 | Chen et al. |
| 6,762,873 B1 | 7/2004 | Coker et al. |
| 6,775,174 B1 | 8/2004 | Huffman et al. |
| 6,778,155 B1 | 8/2004 | Doherty et al. |
| 6,787,384 B1 | 9/2004 | Okumura |
| 6,787,438 B1 | 9/2004 | Nelson |
| 6,788,520 B1 | 9/2004 | Behin et al. |
| 6,794,119 B1 | 9/2004 | Miles |
| 6,811,267 B1 | 11/2004 | Allen et al. |
| 6,813,060 B1 | 11/2004 | Garcia et al. |
| 6,819,469 B1 | 11/2004 | Koba |
| 6,822,628 B1 | 11/2004 | Dunphy et al. |
| 6,829,132 B1 | 12/2004 | Martin et al. |
| 6,853,129 B1 | 2/2005 | Cummings et al. |
| 6,855,610 B1 | 2/2005 | Tung et al. |
| 6,859,218 B1 | 2/2005 | Luman et al. |
| 6,861,277 B1 | 3/2005 | Monroe et al. |
| 6,862,022 B1 | 3/2005 | Slupe |
| 6,862,029 B1 | 3/2005 | D'Souza et al. |
| 6,867,896 B1 | 3/2005 | Miles |
| 6,870,581 B1 | 3/2005 | Li et al. |
| 2001/0003487 A1 | 6/2001 | Miles |
| 2001/0043171 A1 | 11/2001 | Van Gorkom et al. |
| 2002/0005827 A1 | 1/2002 | Kobayashi |
| 2002/0012159 A1 | 1/2002 | Tew |
| 2002/0015215 A1 | 2/2002 | Miles |
| 2002/0024711 A1 | 2/2002 | Miles |
| 2002/0036304 A1 | 3/2002 | Ehmke et al. |
| 2002/0050882 A1 | 5/2002 | Hyman et al. |
| 2002/0054424 A1 | 5/2002 | Miles et al. |
| 2002/0075226 A1 | 6/2002 | Lippincott |
| 2002/0075555 A1 | 6/2002 | Miles |
| 2002/0093722 A1 | 7/2002 | Chan et al. |
| 2002/0097133 A1 | 7/2002 | Charvet et al. |
| 2002/0126364 A1 | 9/2002 | Miles |
| 2002/0186108 A1 | 12/2002 | Hallbjorner |
| 2003/0004272 A1 | 1/2003 | Power |
| 2003/0043157 A1 | 3/2003 | Miles |
| 2003/0072070 A1 | 4/2003 | Miles |
| 2003/0122773 A1 | 7/2003 | Washio et al. |
| 2003/0137215 A1 | 7/2003 | Cabuz |
| 2003/0137521 A1 | 7/2003 | Zehner et al. |
| 2003/0189536 A1 | 10/2003 | Ruigt |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0022044 A1 | 2/2004 | Yasuoka et al. |
| 2004/0027701 A1 | 2/2004 | Ishikawa |
| 2004/0051929 A1 | 3/2004 | Sampsell et al. |
| 2004/0058532 A1 | 3/2004 | Miles et al. |
| 2004/0080807 A1 | 4/2004 | Chen et al. |
| 2004/0145049 A1 | 7/2004 | McKinnell et al. |
| 2004/0147056 A1 | 7/2004 | McKinnell et al. |
| 2004/0160143 A1 | 8/2004 | Shreeve et al. |
| 2004/0174583 A1 | 9/2004 | Chen et al. |
| 2004/0179281 A1 | 9/2004 | Reboa |
| 2004/0212026 A1 | 10/2004 | Van Brocklin et al. |
| 2004/0217378 A1 | 11/2004 | Martin et al. |
| 2004/0217919 A1 | 11/2004 | Pichl et al. |
| 2004/0218251 A1 | 11/2004 | Piehl et al. |
| 2004/0218334 A1 | 11/2004 | Martin et al. |
| 2004/0218341 A1 | 11/2004 | Martin et al. |
| 2004/0227493 A1 | 11/2004 | Van Brocklin et al. |
| 2004/0240032 A1 | 12/2004 | Miles |
| 2004/0240138 A1 | 12/2004 | Martin et al. |
| 2004/0245588 A1 | 12/2004 | Nikkel et al. |
| 2004/0263944 A1 | 12/2004 | Miles et al. |
| 2005/0001828 A1 | 1/2005 | Martin et al. |
| 2005/0012577 A1 | 1/2005 | Pillans et al. |
| 2005/0038950 A1 | 2/2005 | Adelmann |
| 2005/0057442 A1 | 3/2005 | Way |
| 2005/0068583 A1 | 3/2005 | Gutkowski et al. |
| 2005/0069209 A1 | 3/2005 | Damera-Venkata et al. |
| 2005/0116924 A1 | 6/2005 | Sauvante et al. |
| 2006/0114542 A1* | 6/2006 | Bloom ............... 359/276 |

FOREIGN PATENT DOCUMENTS

| | | |
|---|---|---|
| EP | 0300754 A2 | 1/1989 |
| EP | 0306308 A2 | 3/1989 |
| EP | 0318050 A | 5/1989 |
| EP | 0570906 A | 11/1993 |
| EP | 0608056 A1 | 7/1994 |
| EP | 0655725 A1 | 5/1995 |
| EP | 0 667 548 A1 | 8/1995 |
| EP | 0725380 A1 | 8/1996 |
| EP | 0852371 A1 | 7/1998 |
| EP | 0911794 A1 | 4/1999 |
| EP | 1 146 533 A | 10/2001 |
| EP | 1343190 A | 9/2003 |
| EP | 1473691 A2 | 11/2004 |
| GB | 2401200 A | 11/2004 |
| WO | WO 95/30924 | 11/1995 |
| WO | WO 97/17628 | 5/1997 |
| WO | WO 99/52006 A3 | 10/1999 |
| WO | WO 03/007049 A1 | 1/2003 |
| WO | WO 2003/015071 A2 | 2/2003 |
| WO | WO 2003/044765 A2 | 5/2003 |
| WO | WO 03/060940 A | 7/2003 |
| WO | WO 03/069413 A1 | 8/2003 |
| WO | WO 03/073151 A1 | 9/2003 |
| WO | WO 2003/090199 A1 | 10/2003 |
| WO | WO 04/006003 A1 | 1/2004 |
| WO | WO 04/026757 A2 | 4/2004 |
| WO | WO 2004/049034 A1 | 6/2004 |

OTHER PUBLICATIONS

Peroulis et al., Low contact resistance series MEMS switches, 2002, pp. 223-226, vol. 1, IEEE MTT-S International Microwave Symposium Digest, New York, NY.

Bains, "Digital Paper Display Technology holds Promise for Portables", CommsDesign EE Times (2000).

Lieberman, "MEMS Display Looks to give PDAs Sharper Image" EE Times (2004).

Lieberman, "Microbridges at heart of new MEMS displays" EE Times (2004).

* cited by examiner

SYSTEM AND METHOD FOR ADDRESSING A MEMS DISPLAY

This application is a continuation in part of U.S. Application Ser. No. 10/731,989, filed Dec. 9, 2003. This application also claims priority to U.S. Provisional Application No. 60/613,458, titled "PIXEL ELEMENT WITH SUB-PIXELS HAVING DIFFERING ACTUATION VOLTAGES", filed Sep. 27, 2004, U.S. Provisional Application No. 60/604,896, filed Aug. 27, 2004 titled "METHODS OF ADDRESSING A BI-STABLE MODULATOR"; U.S. Provisional Application No. 60/606,223, filed Aug. 31, 2004, titled "METHODS OF ADDRESSING A BI-STABLE MODULATOR"; and U.S. Provisional Application No. 60/614,032, titled "SYSTEM AND METHOD FOR INTERFEROMETRIC MODULATION", filed Sep. 27, 2004. Each of the foregoing applications is incorporated by reference, in its entirety.

BACKGROUND

1. Field

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Preferred Embodiments" one will understand how the features of this invention provide advantages over other display devices.

One embodiment is a light modulator that includes an array of elements at least some of which have different values of deflection versus addressing pulse width. The light modulator further includes addressing circuitry configured to provide addressing pulses of varying width to the array of elements such that different combinations of elements switch in a selectable manner, depending upon the width of the addressing pulses.

Another embodiment is a light modulator that includes an array of elements having differing values of deflection versus applied voltage. The light modulator further includes addressing circuitry configured to provide addressing pulses of varying voltage level to the array of elements such that different combinations of elements switch in a selectable manner, depending upon the voltage level of the addressing pulses.

Another embodiment is a display including a plurality of MEMS elements arranged in rows. The MEMS elements of each of the rows are further arranged in subrows. The subrows of each row are electrically connected. The display further includes a plurality of resistors. Each of the resistors is connected to a respective one of the subrows. The respective one of the resistors for each of the subrows of each row has a different resistance from the resistors connected to the other subrows of the row.

Another embodiment is a method of addressing a plurality of display elements having at least a first and second display element and characterized by respective response thresholds. The method includes generating a first pulse characterized by a parameter having a value greater than the response threshold of the first display element and less than the response threshold of the second display element. The method further includes applying the first pulse to the plurality of display elements.

One embodiment is a driver circuit for addressing a plurality of display elements having at least a first and second display element and characterized by respective response thresholds. The driver circuit includes means for generating a first pulse characterized by a parameter having a value greater than the response threshold of the first display element and less than the response threshold of the second display element. The driver circuit further includes means for applying the first pulse to the plurality of display elements.

DETAILED DESCRIPTION OF PREFERRED EMBODIMENTS

In preferred embodiments, the invention addresses a group of display elements with a drive signal applied through a common driver connection to the group of display elements. The display can thus produce more shades of gray, or color, with a smaller number of leads than would be necessary if drive signal for each display element were applied through separate leads for each display element.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
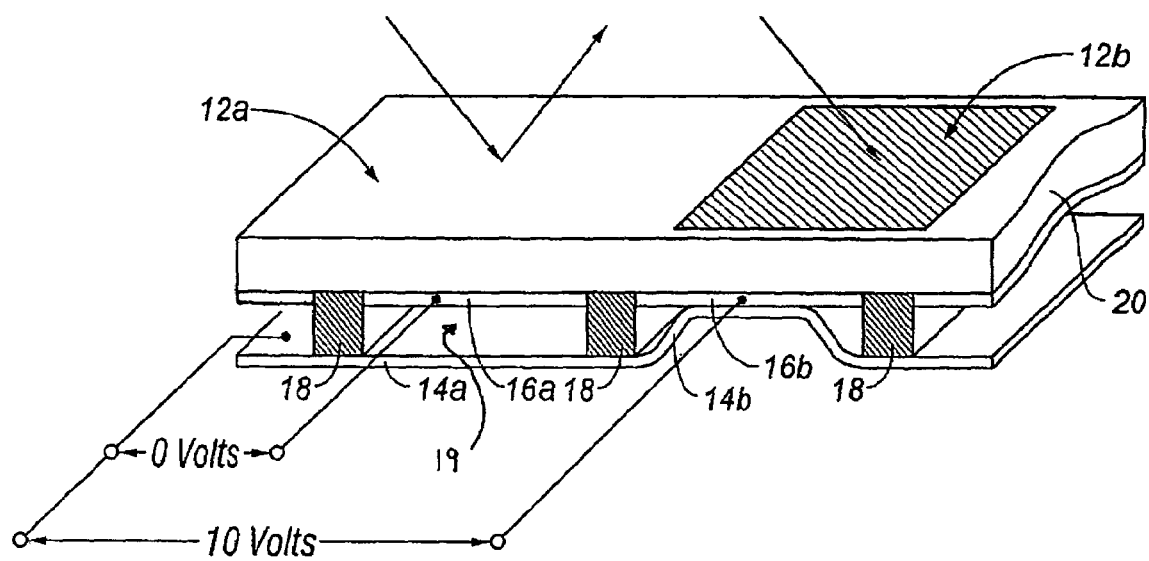
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
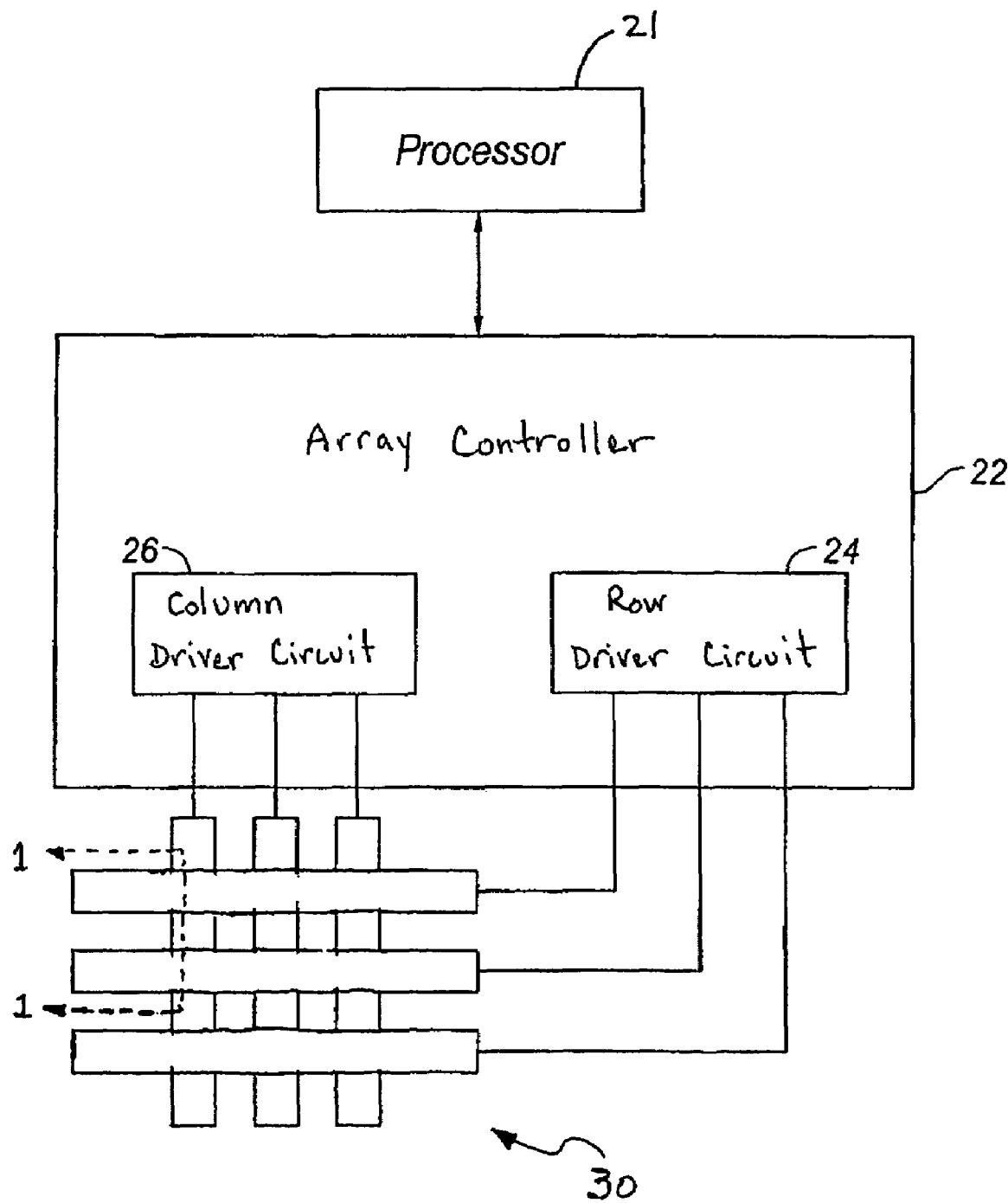
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1—1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3–7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row I electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
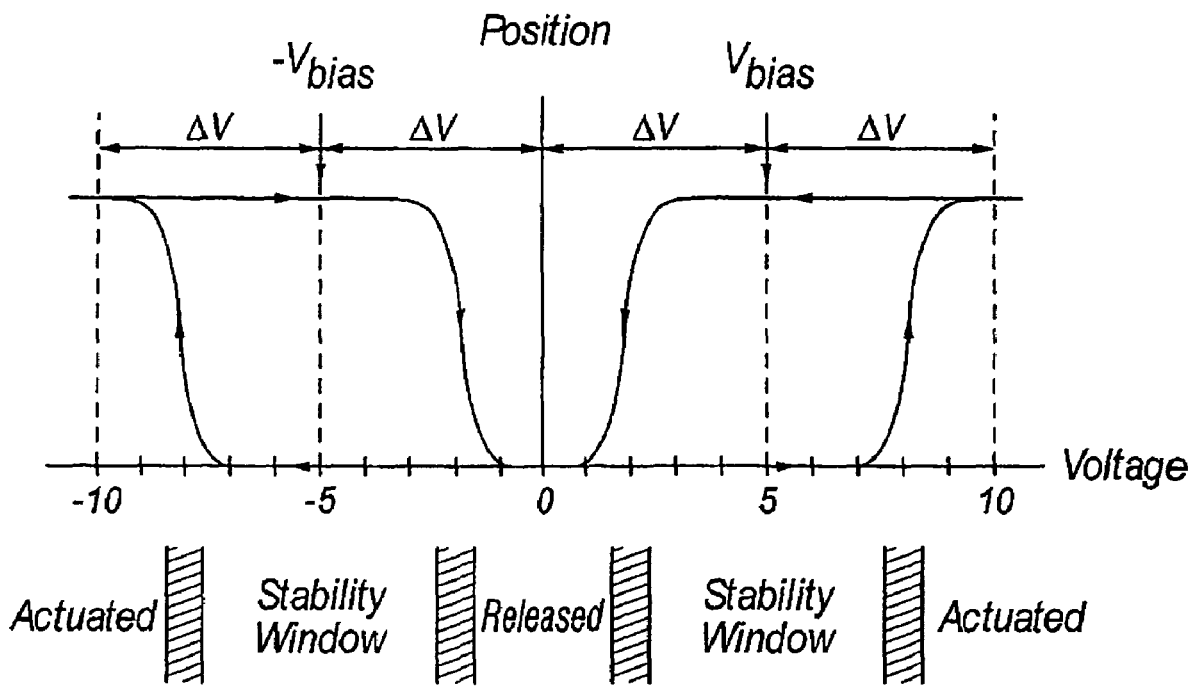
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
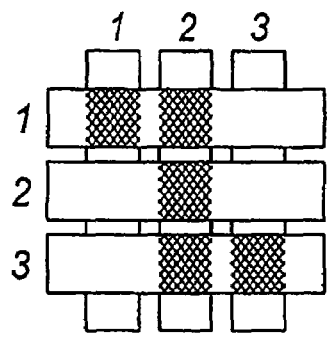
FIGS. 5A and 5B illustrate one exemplary timing diagram for row and column signals that may be used to write a frame of display data to the 3×3 interferometric modulator display of FIG. 3.
Figure 5B:
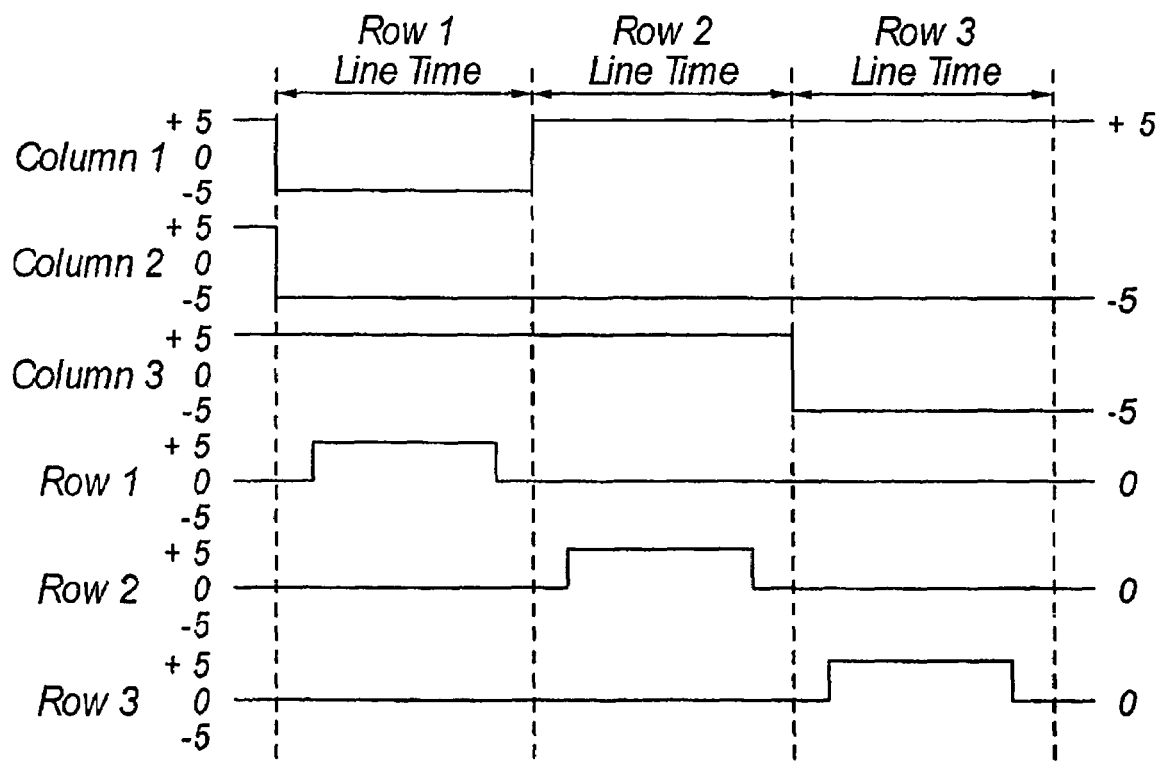

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3–7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
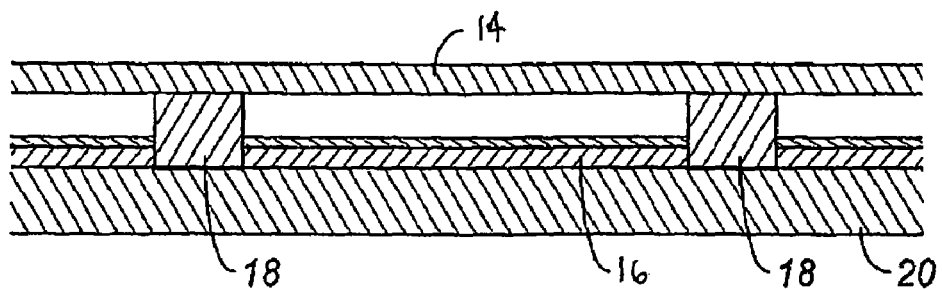
FIG. 6A is a cross section of the device of FIG. 1.
Figure 6B:
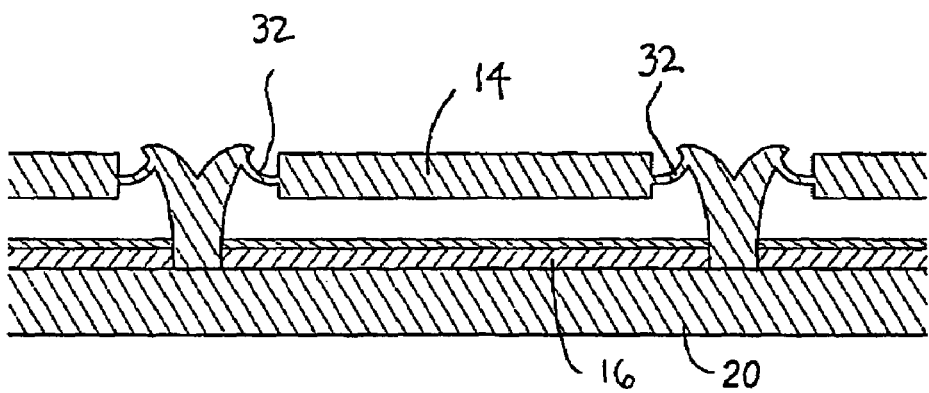
FIG. 6B is a cross section of an alternative embodiment of an interferometric modulator.
Figure 6C:
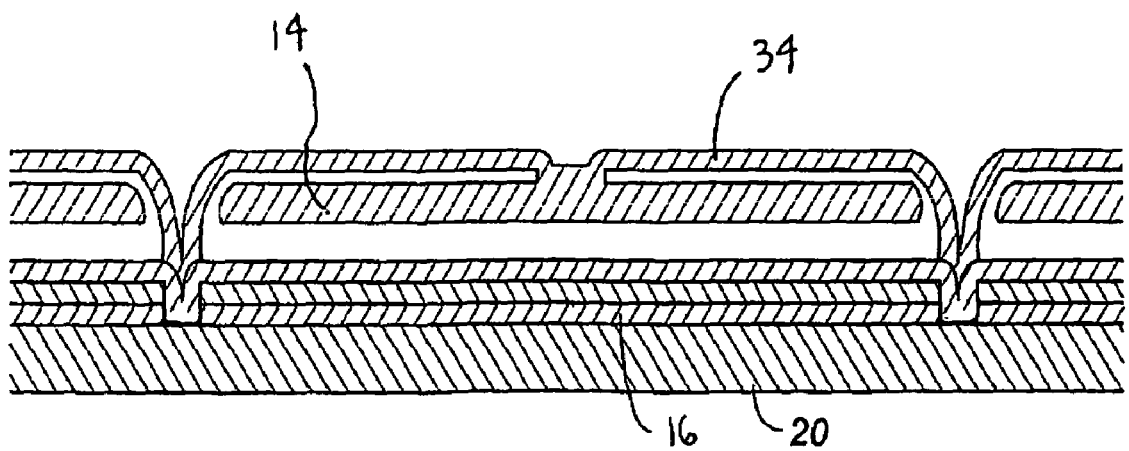
FIG. 6C is a cross section of another alternative embodiment of an interferometric modulator.

The details of the structure of interferometric modulators that operate in accordance with the principles set forth above may vary widely. For example, FIGS. 6A–6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Data describing a monochrome display image may include one bit of data per pixel. One embodiment of a monochrome display includes one interferometric modulator per pixel, the on or off state of the modulator being set based on the value of the one bit of data per pixel. A greyscale image may include several bits of data per pixel. For example, a "3 bit" grayscale display includes 3 bits of data per pixel that correspond to one of eight shades of gray that may be assigned to each pixel. One embodiment of a display for displaying an exemplary 3 bit grayscale image includes three interferometric modulators for each pixel. To obtain the eight shades, the three modulators reflect light according to a ratio of 1:2:4. In one such embodiment, each of the interferometric modulators includes mirrors having a reflective surface area that varies according to the ratio of 1:2:4. A particular shade in a pixel is obtained in such an embodiment by setting each modulator to an on or off state based on the binary value of a corresponding bit of the 3 bits of data. One embodiment of a color display works similarly except that the color display includes a group of red, green, and blue interferometric modulators. For example, in a 12-bit color display, 4 of the 12 bits correspond to each of 16 intensities of red, green, and blue which are produced by red, green, or blue interferometric modulators. Such greyscale or color displays have more display elements to address than does a monochrome display. In order to address these display elements for such embodiments of gray or color displays, the number of electrical connections to the display control increases. For example, in one embodiment of a 3×3 3-bit grayscale display, each of the rows is subdivided into 3 subrows. Each pixel of such an embodiment of the display comprises the interferometric modulators of the three subrows. One such embodiment has 3*3=9 row driver connections and 3 column driver connections for a total of twelve driver connections rather than the 6 for a 3×3 monochrome display.

One way of reducing the number of driver connections is to electrically connect together a group of modulators, for example, the 3 subrows in the 3 bit grayscale embodiment discussed above, and drive the group with a signal that changes the state of a subset of the electrically connected group.

For example, one way to selectively address a group of electrically connected interferometric modulators is to apply a drive signal in a pulse that is not of a sufficient duration to change the state of some of the group of modulators. Generally, the time period for a particular modulator in the display to change state in response to the leading edge of the row strobe may be referred to as a response time, $\tau$. Note that the term "response time" may refer to either the time for an interferometric modulator to move from a reflective to non-reflective state or the time for the modulator to move from the non-reflective state to the reflective state. In one embodiment of the interferometric modulator display, the time period $\tau$ is conceptually the sum of an electrical response time, $\tau_{RC}$, and a mechanical response time, $\tau_M$. With respect to the electrical response time, each of the interferometric modulators in the display is forms a respective circuit that may be characterized by a resistor-capacitor (RC) time constant. The electrical response time, $\tau_{RC}$, is the time period from the leading edge of the row strobe pulse to the time that the circuit is charged to the actuation or release voltage across the mirrors. The mechanical response time, $\tau_M$, is the time period for the movable mirror to physically change positions once the actuation or release voltage has been reached. The time for the modulator to move to a new position, $\tau_M$, is dependent on factors such as a spring constant associated with the movable mirror of the modulator and the resistance to air of the mirror as it moves. One embodiment of the display includes groups of electrically connected modulators with different response times. By applying a common pulse to the group of modulators that is shorter than the response time of some of the modulators but longer than the response time of other of the modulators, the state of different combinations of the modulators can be set.

Figure 7:
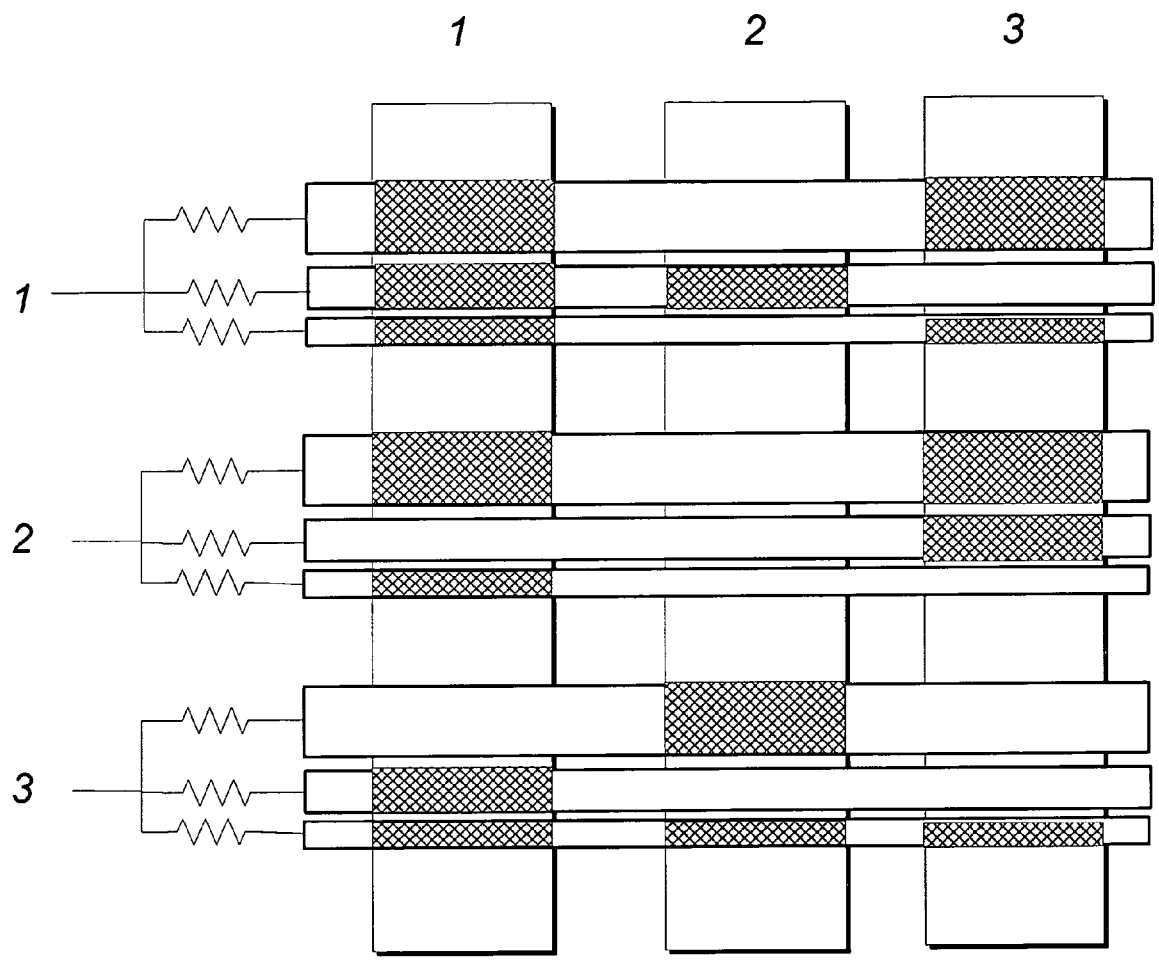
FIG. 7 is a partial schematic diagram of an embodiment of an interferometric modulator display in which the rows have been subdivided into three subrows that share a common driver connection.

FIG. 7 is a partial schematic diagram of an embodiment of an interferometric modulator display, similar to that shown in FIG. 5A, in which the rows have been subdivided into three subrows that share a common driver connection. Each of the subrows defines one interferometric modulator at each column. As discussed above, if a row strobe is applied for a time that is less than the response time, movable mirror of the interferometric modulator substantially maintains its position. In the embodiment of FIG. 7, the interferometric modulators of the subrows are depicted from top to bottom with decreasing response times. In such an embodiment, the interferometric modulators of the subrows may be addressed via the common driver connection by suitably varying the duration of the row strobe so as to change the state of only a selected portion of the subrows.

The response times of an interferometric modulator is affected by the characteristic resistor-capacitor (RC) time of the driver circuit inclusive of the modulator, i.e., the time for the movable mirror of the modulator to be charged to a particular voltage, of the mechanical properties of the modulator, and of the resistance of the movable mirror to moving through air. In the embodiment depicted in FIG. 7, the response times of the interferometric modulators along the subrows are varied by varying the series resistance of each subrow. More particularly, in FIG. 7, each of the subrows is connected via a resistor that provides a progressively lower resistance for each subrow from top to bottom. When a voltage is applied between the mirrors of the modulators, those with the larger resistors take longer to charge, and thus take longer for the voltage difference to fall outside of the stability window for sufficient time for the movable mirror to actuate to a new position.

Figure 8:
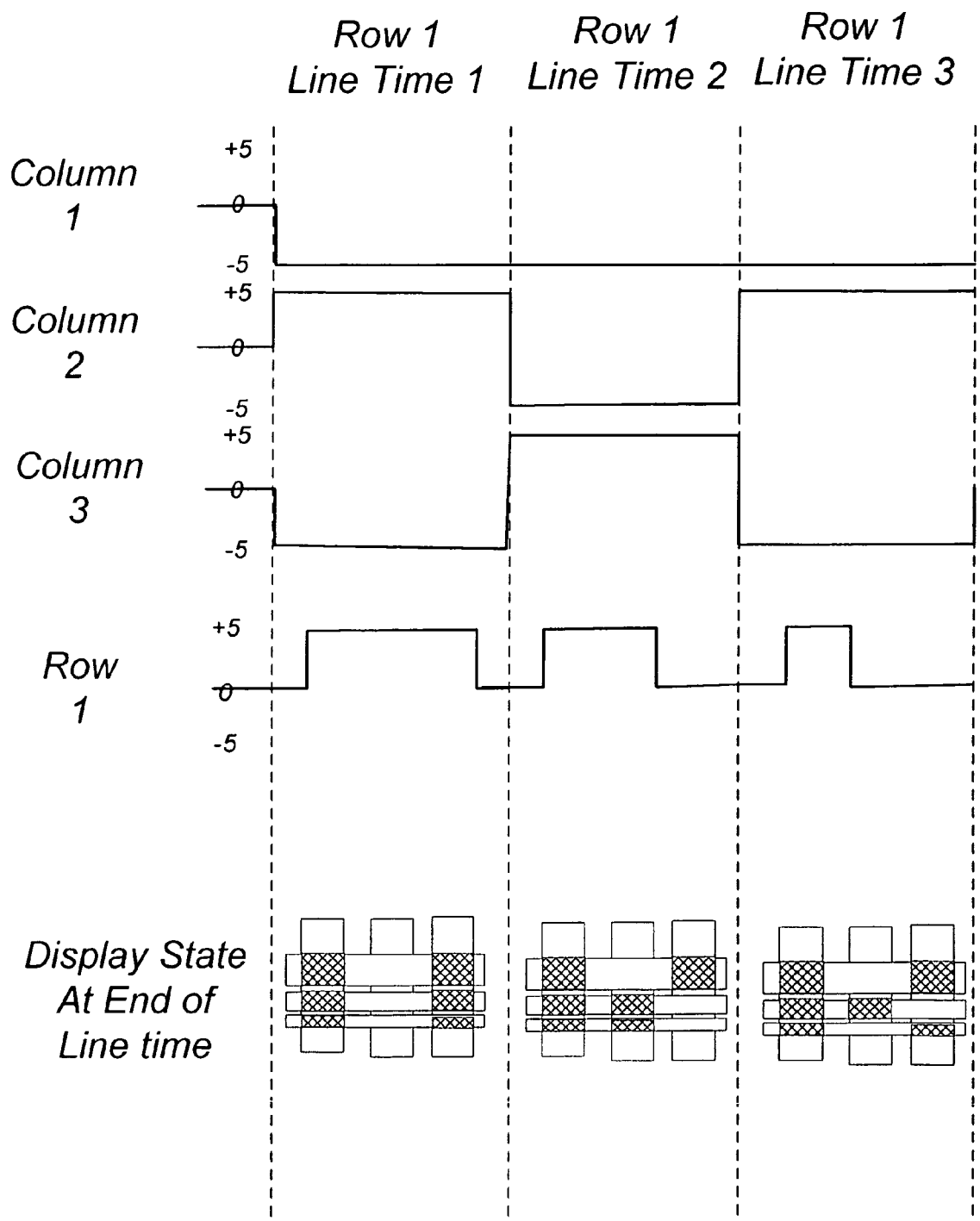
FIG. 8 is a timing diagram that illustrates a series of row and column signals applied to the top row of the embodiment of the array of FIG. 7 to produce the illustrated display arrangement.

FIG. 8 is a timing diagram that illustrates a series of row and column signals applied to the top row (Row 1) of the embodiment of the array of FIG. 7 to produce the illustrated display arrangement. The row and column signals in one embodiment are similar to those depicted in FIG. 5B, except that a series of pulses is applied for each row to address each of the subrows, with each of the pulses varying in duration. The reflective state of the display at the end of each line time is illustrated graphically on FIG. 7 below each the pulses of each respective line time. The pulses are applied during a series of line times for each row, one line time for each subrow. The row pulses for each of these line times have magnitudes of +5 volts and a varying (decreasing from left to right) duration. The decreasing duration is selected so that the row pulses address only those modulators in subrows that have response times shorter than the row pulses.

The pulses of FIG. 8 set the state of the display to that depicted in FIG. 7 as follows. For the first line time for Row 1, Column 1, a column potential of −5 volts is applied along with the +5 volt row pulse to set the state of the modulators of each of the subrows in the actuated position as illustrated along the bottom of FIG. 8. The Column 1 potential remains at −5 for the remaining Row 1 lines times to maintain each of the elements in the subrows in the actuated position. In Column 2, a potential of +5 volts is applied in conjunction with the row pulse in the first line time to release all modulators in the subrows in Column 2. During the second line time for Row 1, a Column 2 potential of −5 volts is applied in conjunction with the row pulse so as to actuate the bottom two subrows of Row 1. The duration of the row pulses in the second line time is shorter than the response times of the top subrow, so the states of the modulator in the top subrow is maintained. During the third row time for Row 1, a Column 2 potential is applied at −5 volts in conjunction with the row pulse to actuate the modulator in the bottom subrow. Again, the row pulse duration of the third row time is shorter than the response time of the modulators in all but the bottom subrow so that only the bottom row changes state. The data set for Column 3 is applied according to FIG. 8 to set the state of the subrows of Column 3.

In the illustrated embodiment, each of these line times for a row is approximately the same. However, it is to be recognized that in other embodiments, the line times may be shorter, for example, the line times for a row may shortened to correspond to the shorter row pulse durations of each of the line times of a row. Further, any other suitable drive voltage scheme may be used in place of the exemplary scheme depicted in FIGS. 5B and 7. Further, while the subrows in the illustrated embodiment include varying resistances that vary the RC time of the subrows, in other embodiments, the subrows may have varying capacitances, resistances, or a combination thereof.

In some embodiments, the response time of the interferometric modulators is varied by mechanical differences rather than electrical differences in the subrows. For example, variation in the damping force caused by the air in the small cavity between movable mirror and the fixed mirror can vary the response times. This damping force acts as a resistance to moving the movable mirror through air. In one embodiment, this force is varied by forming holes in the movable mirror to reduce the air pressure against the movable mirror as it actuates and thus changes the electromechanical response of the actuator. In another embodiment, the holes are formed in the deformable film 34 of FIG. 6C. Other similar embodiments of interferometric modulators with varying response times are discussed in U.S. patent application Ser. No. 10/794,737, filed Mar. 3, 2004. In one embodiment, the response time of interferometric modulators of the subrows varies based on variation of a combination of one or more of the RC characteristic, the spring constant, or the air damping force.

In other embodiments, other mechanical properties of the interferometric modulators may be varied so as to vary the mechanical response times of the interferometric modulators between subrows. The response time is dependent on several factors that may be varied, including the thickness, mass, or material of the movable mirror 14 or the deformable layer 34 of FIG. 6C. In some embodiments, interferometric modulators in each of the subrows may have different spring constants. Embodiments may also vary the response times by varying the thicknesses, positions, or composition of the supports.

Figure 9:
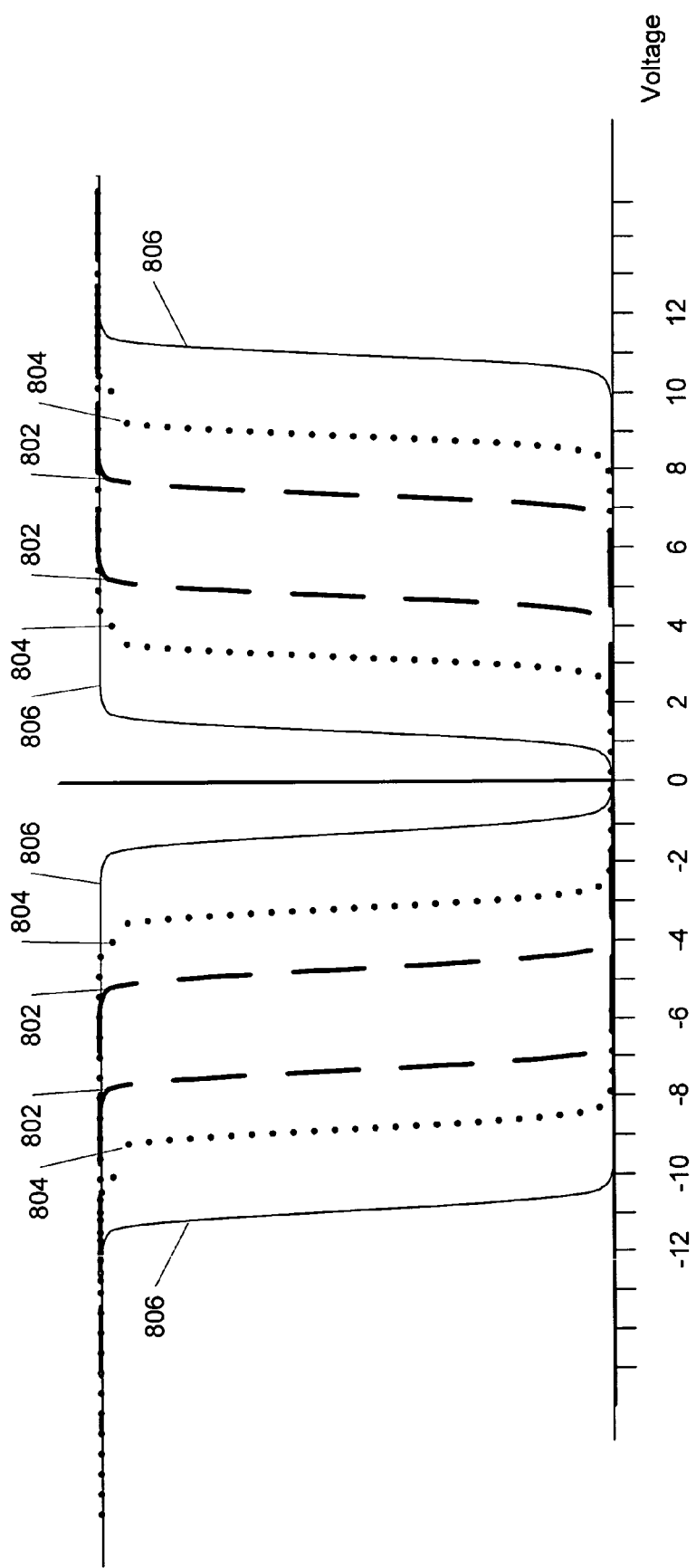
FIG. 9 is a diagram, similar to that of FIG. 3, of movable mirror position versus applied positive voltage illustrating an exemplary embodiment of three interferometric modulators that have nested stability windows.

Rather than having varying response times, in other embodiments, the interferometric modulators of each of the subrows may have varying actuation and release voltages so as to enable a set of electrically connected subrows to be individually addressed. FIG. 9 is a diagram, similar to that of FIG. 3, of movable mirror position versus applied positive voltage illustrating an exemplary embodiment of three interferometric modulators that have respective nested stability windows. The innermost nested hysteresis window, indicated by the traces 802, has an actuation and release voltages having a magnitudes of 8 and 4 volts, respectively. The next nested hysteresis window, indicated by the traces 804, has an actuation and release voltages having a magnitudes of 10 and 2 volts, respectively. The outermost hysteresis window, indicated by the traces 804, has an actuation and release voltages having a magnitudes of 12 and 0 volts, respectively.

The hysteresis window of the modulators associated with each subrow may be selected by varying the geometry and materials of the modulators. In particular, the width (difference between the actuation and release voltages), the location (the absolute values of the actuation and release voltages), and the relative values of the actuation and release voltages may be selected by varying geometric and material properties of the modulators. The varied properties may include, for example, the distance between movable mirror supports, the mass associated with the movable mirror relative to the spring constant, the thickness, tensile stress, or stiffness of the mirror and/or the layers or mechanism that moves the mirror, the dialectic constant or thickness of a dielectric layer between the stationary electrode and the movable electrode. More details of the selection of the hysteresis properties of the interferometric modulators are disclosed in U.S. Provisional Patent No. 60/613,382, entitled "METHOD AND DEVICE FOR SELECTIVE ADJUSTMENT OF HYSTERESIS WINDOW," filed on Sep. 27, 2004.

Figure 10:
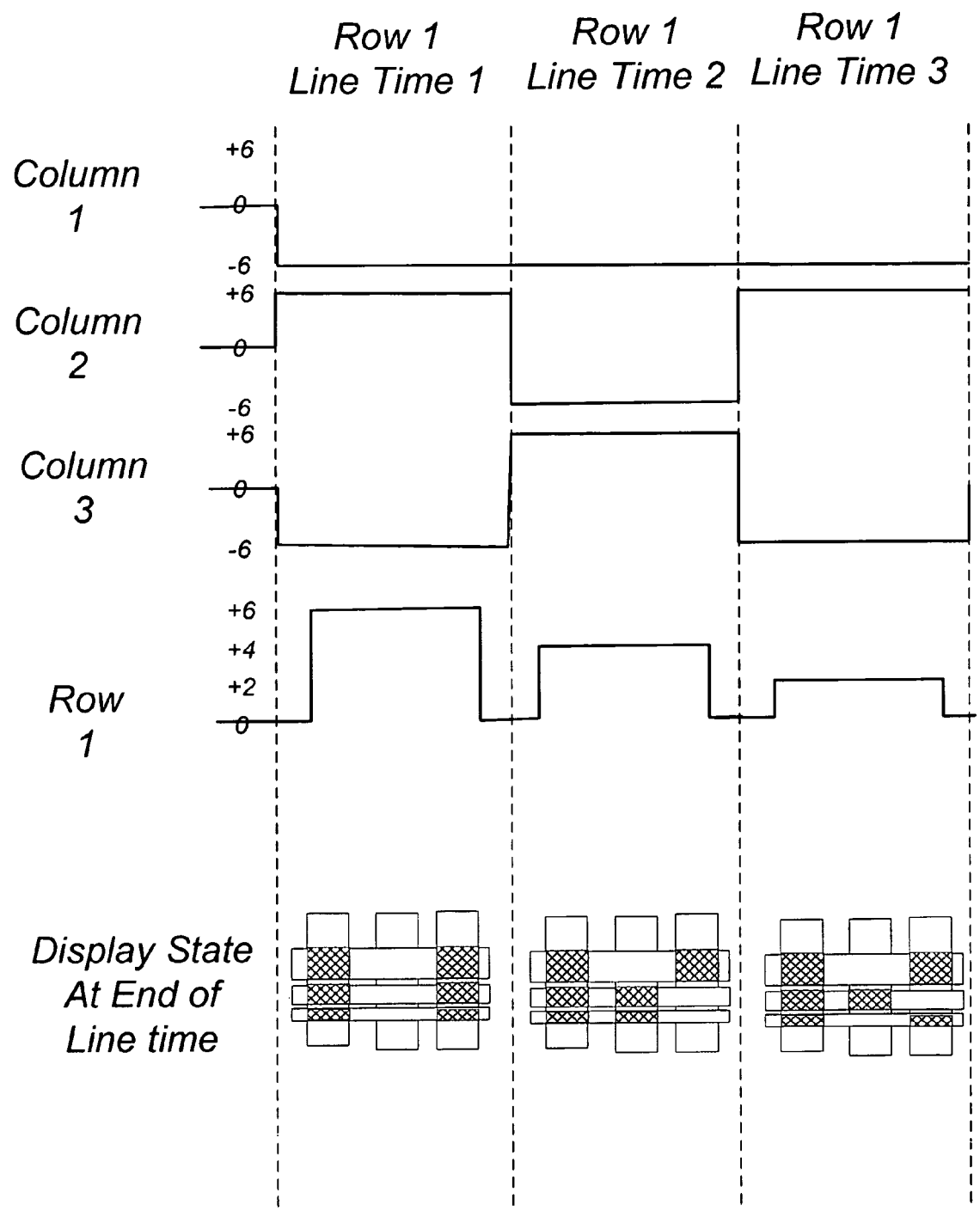
FIG. 10 is a timing diagram that illustrates a series of row and column signals applied to the top row of the embodiment of the array of FIG. 10A to produce the illustrated display arrangement.

In one such embodiment, the interferometric modulators are arranged in subrows as in FIG. 8. The modulators of each of the subrows have hysteresis stability windows that are nested within each other. In the illustrated embodiment, the stability windows are nested from outer to inner, such as the windows depicted FIG. 9, from the top subrow to the bottom subrow. FIG. 10 is a timing diagram that illustrates a series of row and column signals applied to the first row (Row 1) of such an embodiment of an array to produce the illustrated display arrangement. The row and column signals in one embodiment are similar to those depicted in FIG. 8, except that the row pulses vary in magnitude rather than duration. The row pulses decrease in magnitude from left to right, corresponding to the subrows from top to bottom. This decreasing magnitude of the pulses is selected to address only those modulators in subrows that have smaller actuation/greater release voltages. For example, in the illustrated embodiment, potentials of +6 and −6 volts are applied to the columns and row pulses of 2, 4, 6 volts are applied to the row.

The pulses of FIG. 10 set the state of the display to that depicted in FIG. 7 as follows. For the first line time for Row 1, Column 1, a column potential of −6 volts is applied along with the +6 volt row pulse to set the state of the modulators of each of the subrows in the actuated position as illustrated along the bottom of FIG. 8. The Column 1 potential remains at −6 for the remaining Row 1 line times to continue to set the state of each of the elements in the subrows in the actuated position. In Column 2, a potential of +6 volts is applied in conjunction with the row pulse at +6 volts in the first line time to release all modulators in the subrows in Column 2. During the second line time for Row 1, a Column 2 potential of −6 volts is applied in conjunction with a row pulse of +4 volts so as to actuate the bottom two subrows of Row 1. During the third row time for Row 1, a Column 2 potential is applied at −6 volts in conjunction with the row pulse of +2 volts to actuate the modulator in the bottom subrow. The set of pulses for Column 3 is applied according to FIG. 8 to set the state of the subrows of Column 3.

Figure 11:
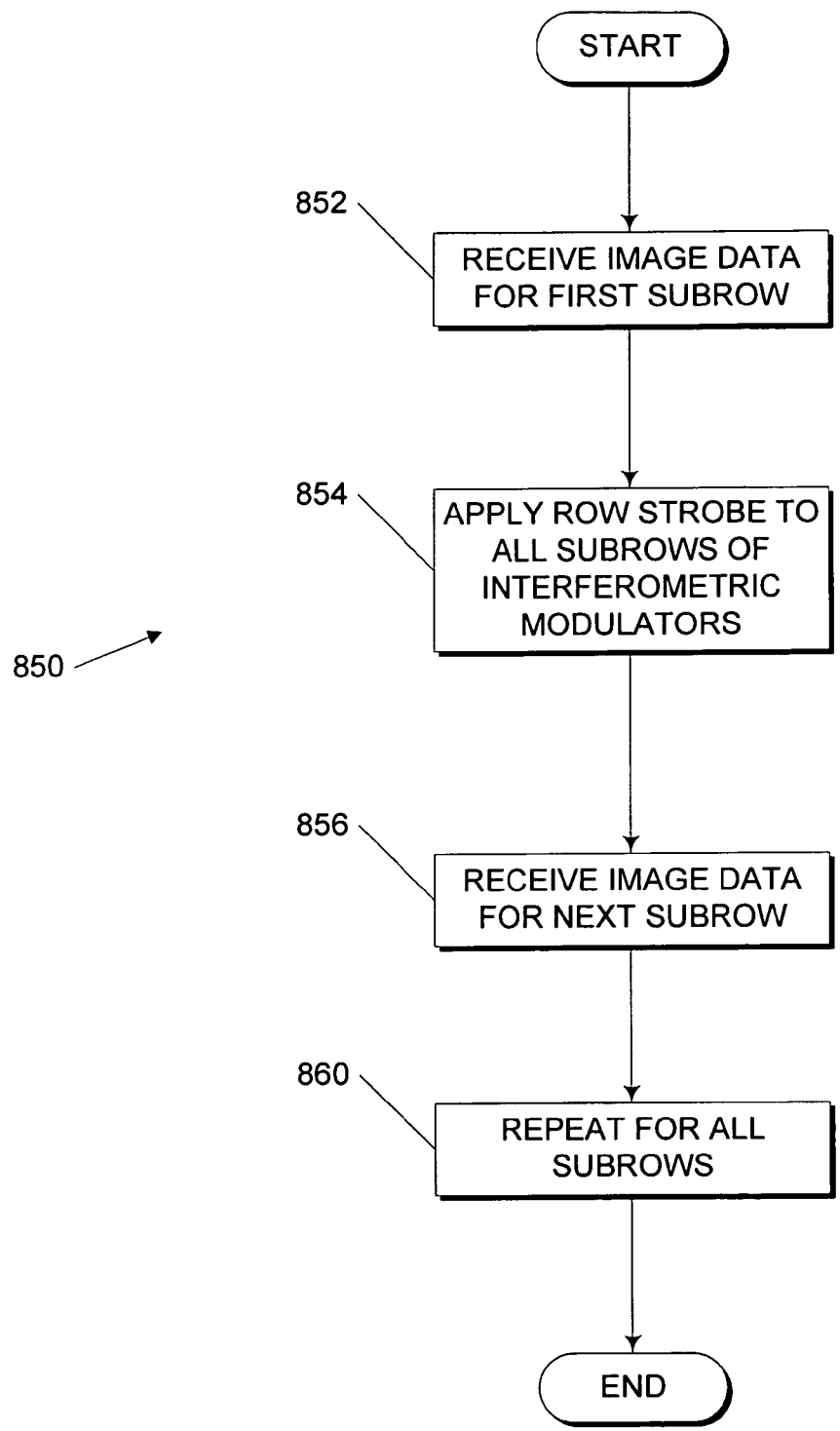
FIG. 11 is a flowchart illustrating one embodiment of a method of driving an interferometric modulator array such as described with respect to FIGS. 6 and 7.

FIG. 11 is a flowchart illustrating one embodiment of a method 850 of updating an embodiment of a display such as in FIGS. 6 and 9A. The method 850 begins at a block 852 in which the driver 22 of FIG. 22 receives image data value for a subrow. In one embodiment, the driver 22 receives the data value from a frame buffer. Next at a block 854, the driver 22 applies a row strobe to all subrows of interferometric modulators along with a column potential that corresponds to the image data value. Moving to block 856, the driver 22 receives the data for the next subrow. Next at block 860, the acts of blocks 854 and 856 are repeated for each of the subrows. In one embodiment, the acts of the blocks 854 and 856 occur at least partially concurrently.

It is to be recognized that while certain embodiments disclosed herein are discussed with respect to "rows" and "columns," these terms are used for convenience only in describing these embodiments. In other embodiments, the properties attributed to rows or columns in the exemplary embodiments may be completely or partially reversed as would be apparent to one of skill in the art. Further, while embodiments are illustrated in FIGS. 7 and 9B with respect to one particular drive scheme, any other suitable drive scheme may be adapted to vary the duration or magnitude of the applied pulses in accordance with the disclosed invention. In addition, while in one embodiment, the groups of interferometric modulators that share a common driver connection are arranged in subrows, it is to be recognized that other embodiments may include any arrangement of groups of interferometric modulators.

Moreover, while certain embodiments have been discussed with respect to electrically connected groups of interferometric modulators with different response times, and certain other embodiments discussed with respect to electrically connected groups of interferometric modulators with different hysteresis stability windows, other embodiments may include groups of electrically connected modulators that have different response times and different hysteresis stability windows. Such embodiments may be addressed using a series of pulses that vary in both duration and voltage.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A light modulator comprising:
   an array of elements at least some of which have different values of deflection versus addressing pulse width; and
   addressing circuitry configured to provide addressing pulses of varying width to the array of elements such that different combinations of elements switch in a selectable manner, depending upon the width of the addressing pulses.

2. The light modulator of claim 1, wherein at least some different elements of said array have differing mechanical structures to effect differing values of deflection versus addressing pulse width.

3. The light modulator of claim 2, wherein different elements of said array have differing spring constants for deflectable portions of the elements.

4. The light modulator of claim 1, wherein at least some different elements of said array have differing resistor-capacitor (RC) time constants to effect differing values of deflection versus addressing pulse width.

5. The light modulator of claim 1, wherein different elements of said array have differing film thicknesses to effect differing values of deflection versus addressing pulse width.

6. The light modulator of claim 1, further comprising at least one of a resistor or capacitor in series with at least one addressing line.

7. A light modulator comprising:
   an array of elements having differing values of deflection versus applied voltage; and
   addressing circuitry configured to provide addressing pulses of varying voltage level to the array of elements such that different combinations of elements switch in a selectable manner, depending upon the voltage level of the addressing pulses.

8. The light modulator of claim 7, wherein at least some different elements of said array have differing mechanical structures to effect differing values of deflection versus applied voltage.

9. The light modulator of claim 7, wherein at least some different elements of said array have differing film thicknesses to effect differing values of deflection versus applied voltage.

10. The light modulator of claim 9, wherein the differing film thicknesses comprise differing thicknesses of an insulator layer between a deflecting and non-deflecting electrode.

* * * * *